United States Patent

[11] 3,566,934

| [72] | Inventor | Elbridge W. Thrasher<br>Ukiah, Calif. |
|---|---|---|
| [21] | Appl. No. | 770,937 |
| [22] | Filed | Oct. 28, 1968 |
| [45] | Patented | Mar. 2, 1971 |
| [73] | Assignee | Masonite Corporation |

[54] SAW GUIDED SPLITTER
10 Claims, 7 Drawing Figs.

[52] U.S. Cl. .................................................. 143/167,
143/37, 143/159
[51] Int. Cl. .................................................. B27b 5/28
[50] Field of Search ..................................... 143/159.15,
159.17, 159, 160, 157, 159.16, 167, 37, 56

[56] References Cited
UNITED STATES PATENTS

| 129,193 | 1872 | Tompkins | 143/159UX |
| 421,861 | 1890 | French | 143/159X |
| 668,343 | 1901 | Roe | 143/56X |
| 3,285,302 | 1966 | Thrasher | 143/56X |
| 98,127 | 1869 | Trunick | 143/160 |

*Primary Examiner*—Andrew R. Juhasz
*Assistant Examiner*—James F. Coan
*Attorney*—Eckhoff and Hoppe

ABSTRACT: In combination with a saw machine having a relatively thin circular saw mounted upon an arbor with floating axial looseness and a saw guide defining a limiting control plane for guiding the leading edge of said saw, a splitter mounted for lateral movement and laterally positioned by the rear edge of said saw.

A splitter for use in saw machines having a circular saw and comprising a pair of spaced contacts, each contact having a bearing surface for making contact with opposite sides of a circular saw, and a divider member having a plurality of resilient contacts that extend into a region above said spaced contacts and in trailing relation to the rear edge of a saw.

INVENTOR.
ELBRIDGE W. THRASHER
BY Eckhoff and Hoppe
ATTORNEYS

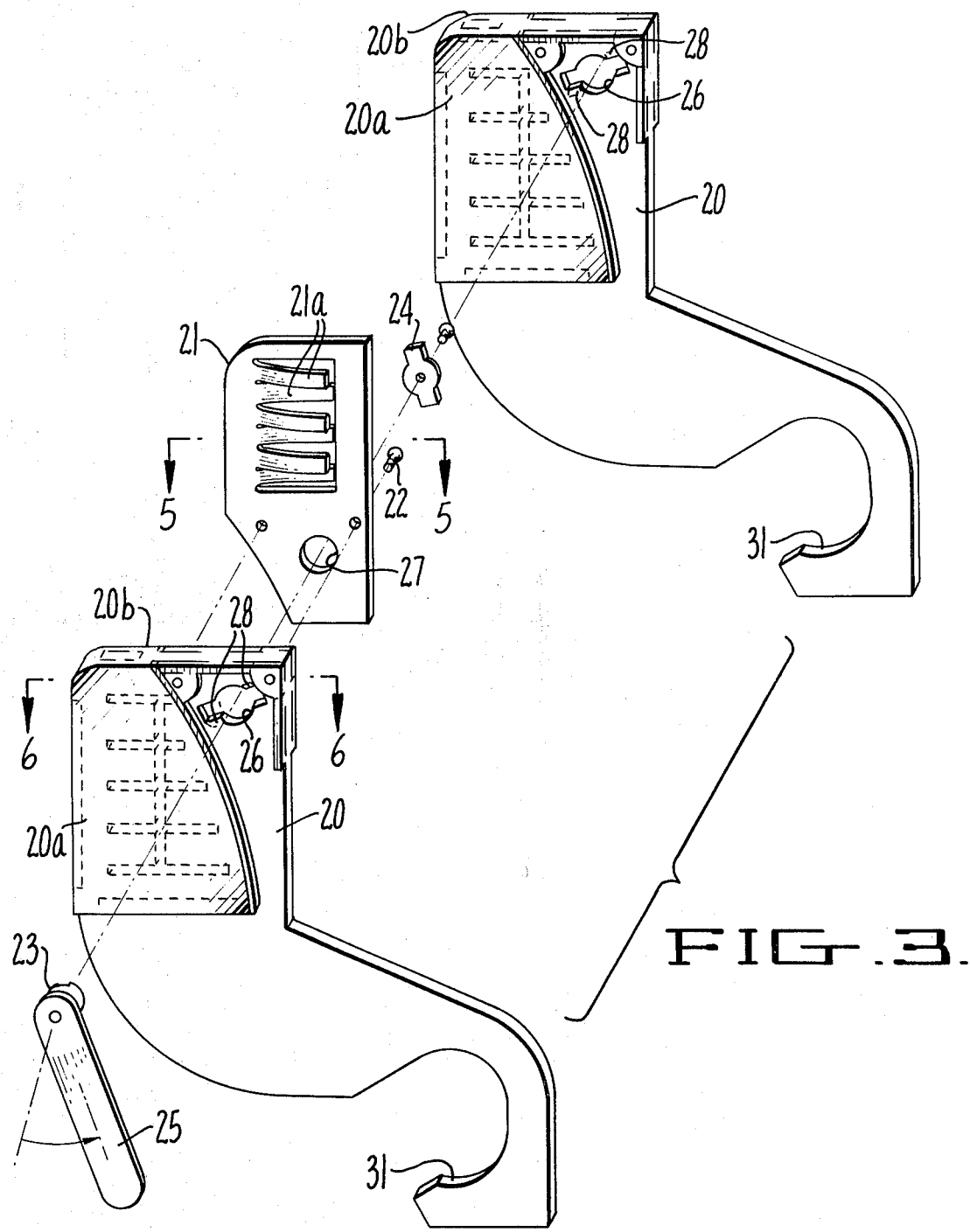

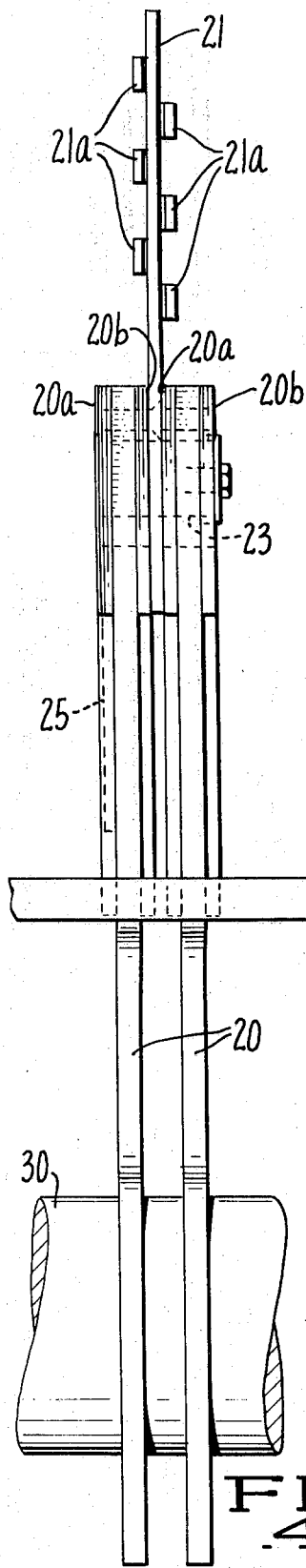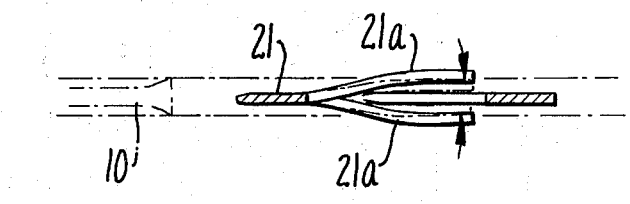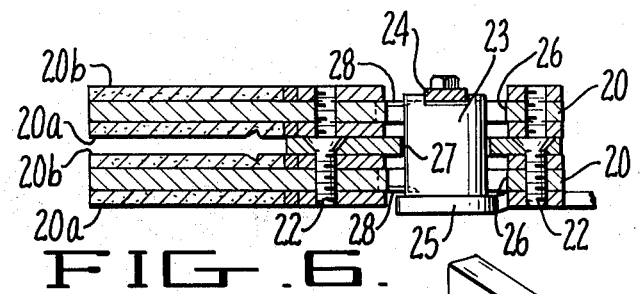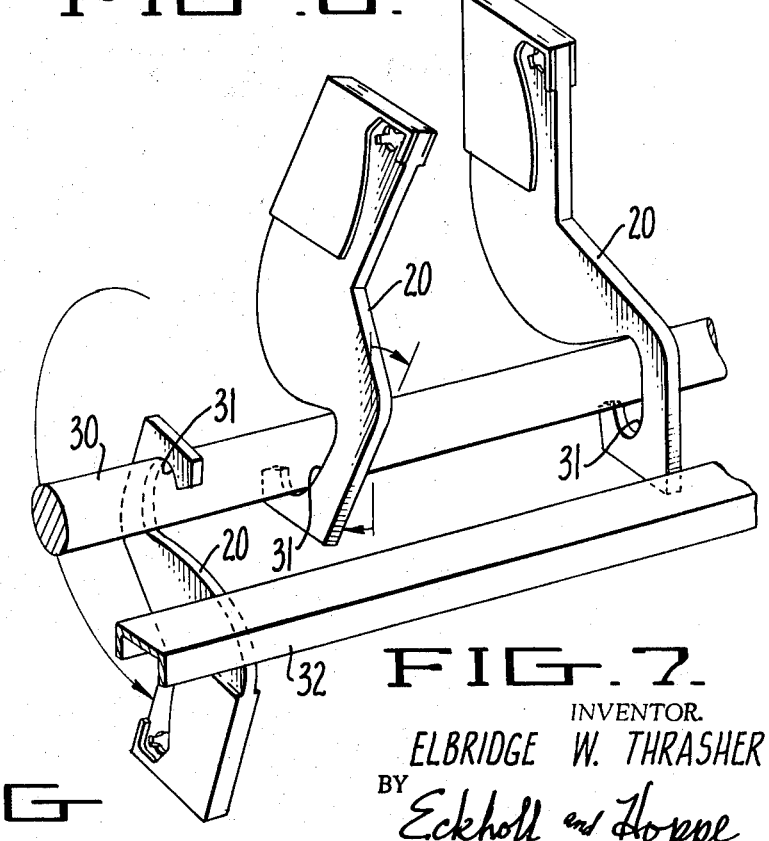

SAW GUIDED SPLITTER

This invention relates to saw machines and to apparatus for separating cut pieces to avoid backcutting. The invention has particular relation to my earlier invention of U.S. Pat. No. 3,285,302 in which saw guides are employed for controlling the cutting action of unusually thin saws.

The present invention is primarily concerned with the problem of "backcutting," which is commonly caused by the contact made by the trailing edge of a circular saw with the pieces that have already been cut. This may result from lateral movement or flexing of the saw blade, or it may be caused by the tendency of cut pieces to bend back into the cutting plane of the saw blade. Backcutting has been controlled and reduced in many machines by the use of devices known as "splitters." Such devices are positioned in back of the saw blades to guide the pieces as they are moved out of the saw. However, conventional splitters have little or no control over backcutting that is attributable to the movement of the saw blades themselves, especially when the saw blades are mounted for axial movement upon an arbor in the manner described in U.S. Pat. No. 3,285,302.

In brief, this invention involves the use of a splitter mounted for lateral movement and laterally positioned by the rear edge of the saw blade. Each splitter is comprised of a pair of spaced guide plates disposed on opposite sides of the saw blade and a divider member, the spacing between said plates being approximately equal to but slightly greater than the thickness of the saw blade. Each guide plate provides an area of contact extending from the rear edge of the saw blade radially inward thereof, lateral movement of the saw blade also imparting a lateral movement to the splitter as to maintain the divider member in trailing alignment with the rear edge of the blade.

A preferred form of the invention contemplates a splitter having a plurality of resilient contacts that extend into a region above the rear edge of the saw blade. These contacts occupy an area of splitting at least as wide as the kerf of the saw, and preferably such that the maximum lateral spacing between contacts on opposite sides of the splitter are greater than the saw kerf of the saw being used. This construction affords means whereby adjacent splitters cooperate to maintain uniform and predetermined spacing between the rear edges of each saw blade in a battery of saws.

In addition, this invention contemplates a splitter construction comprised of two plates and means for disconnectably joining said plates to capture the rear edge of a guided saw; and it has been found that a more responsive guiding action of the splitter is derived by using a large stiffening collar on the saw blade, said collar extending radially outward from the hub into near proximity to the work area of the saw blade.

One object of this invention, therefore, is to provide an improvement in a saw splitter that is mounted for lateral movement and may be laterally positioned by the rear edge of a guided circular saw.

Another object is to provide a splitter of the kind described that may be rapidly and easily positioned in back of a saw blade in a conventional saw machine.

It is another object of the invention to provide a splitter of the kind described that may be mounted to and used with conventional battery edgers having a roll for transporting cut pieces through and beyond the saw and wherein said roll is located in near proximity to the rear edge of said saw.

A further object of this invention is to provide a splitter of the kind described that will be particularly effective in combination with relatively thin circular saws mounted upon an arbor such that the saws have a floating axial looseness.

It is another object of the invention to provide splitters of the kind described which may be used in combination with a battery of saws while simultaneously avoiding backcutting.

Other objects of this invention will become apparent in view of the following detailed description and the accompanying drawings.

In the drawings forming a part of this application and in which like parts are identified by like reference numerals throughout the same:

FIG. 3 is an exploded perspective view of the splitter shown in FIG. 1;

FIG. 4 is an enlarged section taken on broken lines 4–4 of FIG. 1;

FIG. 5 is an enlarged section taken on lines 5–5 of FIG. 3;

FIG. 6 is a section taken on lines 6–6 of FIG. 3; and

FIG. 7 is a perspective view showing various positions for one of the splitter guide plates.

Figure 1:
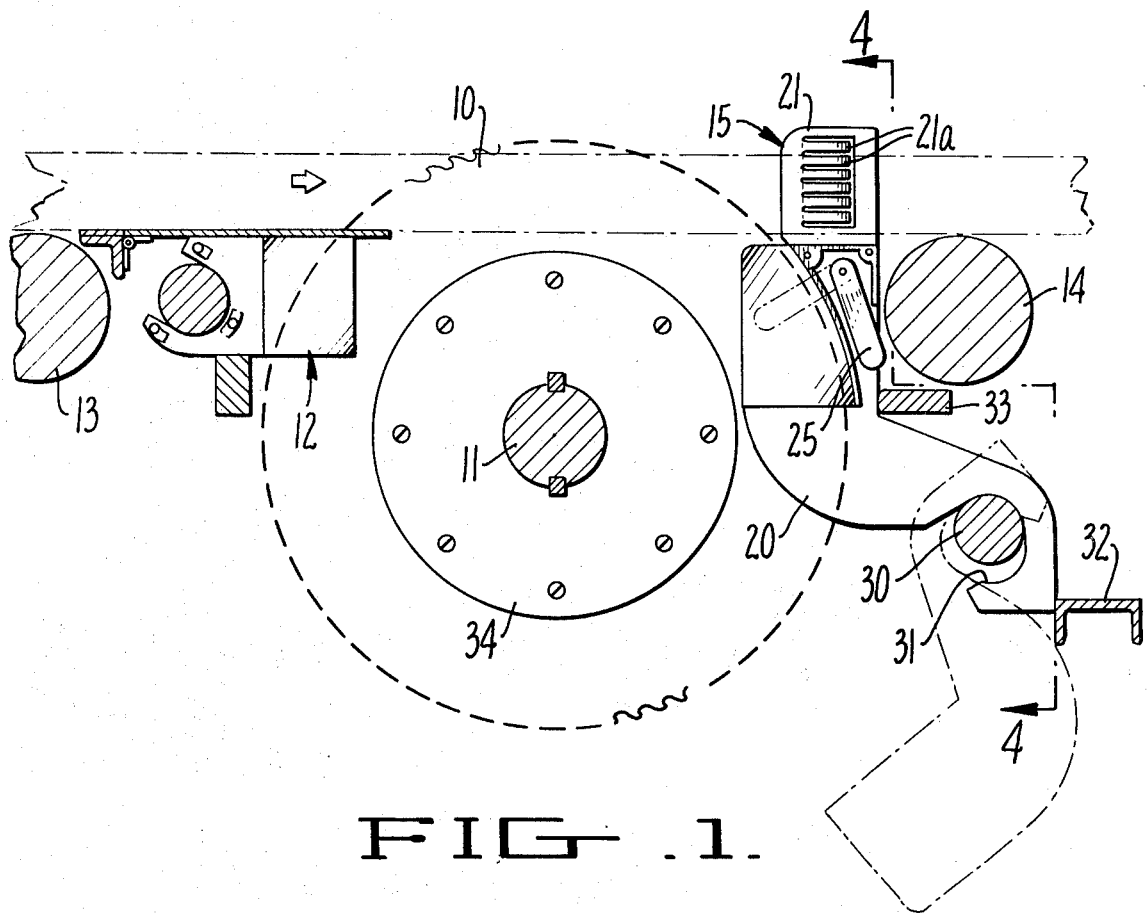
FIG. 1 is an essentially schematic view of a saw machine constructed in a preferred manner contemplated by this invention, certain portions of the machine being shown in side elevation and other portions in vertical section.

Referring to FIG. 1 in particular, there is shown one embodiment of this invention in an edger machine comprised of a plurality of circular saws 10 mounted on an arbor 11, each saw being keyed to the arbor but axially moveable thereon with floating looseness. The leading edge of each saw blade is held in a predetermined cutting plane by a pair of saw guides 12, each saw guide defining limiting control planes that guide the leading edge of an adjacent pair of saws. A pair of rollers 13 and 14 are employed for moving cants or flitches into and through saw blades 10. This guiding arrangement for saws 10 is essentially the same as described in U.S. Pat. No. 3,285,302.

This invention relates more particularly to the use and construction of splitters 15, each splitter being mounted for lateral movement and laterally positioned by the rear edge of one saw blade 10. Splitters 15 comprise a pair of spaced guide plates 20 that may be clamped together on opposite sides of a saw blade and a divider member 21. Guide plates 20 are identically formed so they may be used either as right or left-hand guide members, each plate having bearing surfaces 20a and 20b formed on opposite sides. Bearing surfaces 20a and 20b are preferably made of a babbitt metal that is held to the guide plates by an integral gridwork which fills openings formed in each guide plate.

Figure 2:
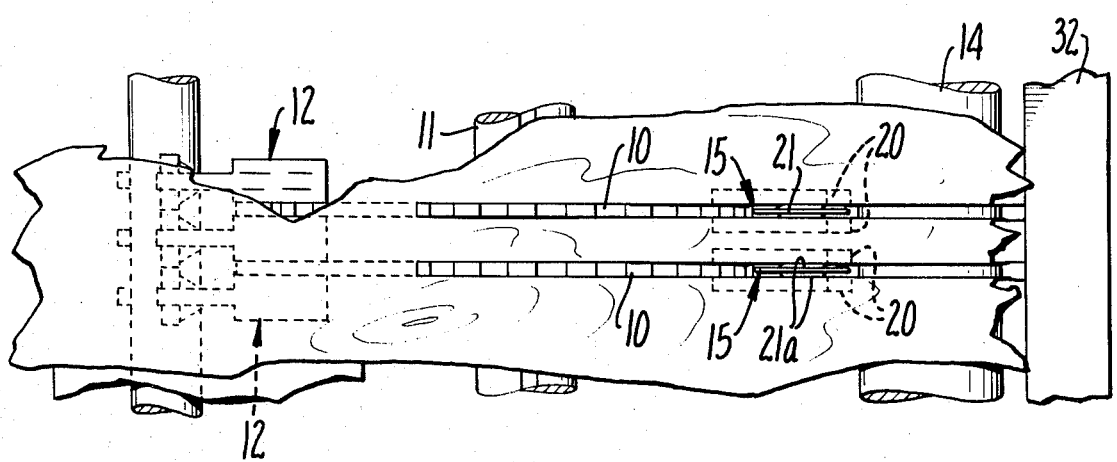
FIG. 2 is an essentially plan view of the machine.

Divider members 21 are mounted between each pair of guide plates, each divider member being fastened to one guide plate by screws 22. Dividers 21 include a plurality of resilient contacts 21a which extend into a region above the rear edge of the saw and occupy an area of splitting at least as wide as the kerf of said saw. It is much preferred, however, that the maximum lateral spacing between contacts on opposite sides of the divider be greater than the saw kerf of the saw. This will mean that the contacts 21a will engage the cut pieces and be resiliently moved to the limits of the saw kerf as the cut pieces are moved through the machine. Such an operation is illustrated in FIG. 2.

Each pair of guide plates 20 are disconnectably joined by a latching device comprised of a stub shaft 23 that carries a key 24 at one end and is mounted to a handle 25 at the other end. Slotted openings 26 are formed in guide plates 20 to receive both stub shaft 23 and key 24 when the key is properly aligned. An opening 27 is also provided in divider plate 21 but this opening will only receive shaft 23 and will not pass key 24. Thus, an assembly of these parts, as indicated in FIG. 3, is such that the latching device may be mounted to that guide plate 20 to which divider member 21 is secured; and the other guide plate may then be joined to the first by aligning key 24 with the keyway of slotted opening 26, projecting key 24 and stub shaft 23 through opening 26, and rotating stub shaft 23 and key 24 by means of handle 25. It will be apparent that this latching means allows the plates to be joined together after they have been placed on opposite sides of a saw blade and while each of the guide plates is supported as shown in FIG. 1.

In preferred construction, camming surfaces (indicated by reference number 28) are provided adjacent to the keyways of slotted openings 26. These surfaces are utilized to draw the plates into tight clamping engagement as key 24 is moved across the camming surfaces by rotating handle 25. When properly clamped, the opposed, facing bearing surfaces of each splitter are positioned in spaced relationship, the distance therebetween being approximately equal to but slightly greater than the thickness of the saw blade which is to be used. If desired, the bearing surface of each guide may be pregrooved to provide a spacing that will accommodate the teeth of the saw. However, this will be unnecessary in most cases since the teeth will cut their own groove during initial operation of the splitter. In either event, each guide plate of the splitter provides an area of contact that extends from the rear edge of the saw blade radially inward thereof, thereby holding the confined edge in a controlled plane.

Because roller 14 is usually and preferably disposed in near proximate relation to the trailing edge of saw blades 10, some difficulty has been found in supporting splitters 15 in positions where they may be guided by the trailing edge of the saw blade and yet provide a divider in close proximity to the trailing edge of the blade. This problem is complicated by the weight of the splitters which makes it difficult it not impossible to remove more than one splitter at a time. These problems have been overcome by mounting support member 30 in vertically displaced relation to roll 14, each splitter plate being formed with an elongate opening 31 that allows the splitter to be pivotally supported therefrom, a stop bar 32 being used to maintain the splitters in operative relation to the saws.

Elongate openings 31, it will be noted, provides a pivotal fit between each plate 20 and support member 30. This fit allows each guide plate to be rocked upon the support member in the manner shown in FIG. 7, the elongate opening 31 allowing plates 20 to be laterally moved such that their lower ends are vertically displaced above stop bar 32. In such position, plates 20 may be pivoted into either the solid line or broken line positions illustrated in FIG. 1. Since each saw blade 10 may be moved axially along its supporting arbor 11, this relationship may be used to advantage in creating the necessary spacing for rocking plates 20 as shown in FIG. 7 and allowing a pair of guide plates to be positioned on opposite sides of a saw blade. It will be apparent that after a pair of guide plates have been positioned on opposite sides of a saw, the two plates are then joined together by use of the latching mechanism, thereby capturing the rear edge of the saw blade.

Inasmuch as saw blades 10 rotate in a direction that tends to move splitters 15 upward, it is desirable to employ a stop bar 33 which will limit this movement and avoid contact between the splitters and roll 14. It has also been found that by stiffening the center portion of relatively thin saw blades you are better able to shift the splitter with axial movement of the saw blade. This may be done by applying a stiffening collar 34 that extends radially outward from the hub of each saw toward the working area of the saw blade. Stiffening collars of this type may be attached with any conventional fasteners such as screws or bolts.

In operation, saw blades 10 are guided in limited control planes by saw guides 12. The inherent operation of the saw blades, however, is such that the blades will be moved axially upon arbor 11. The trailing edge of the saw blades also moves, but being captured between the bearing surfaces of splitters 15, the saw blade will move the splitter laterally. Accordingly, there can be no backcutting. It will be further apparent that the resilient contacts 21a of the divider play an important role in maintaining the desired spacing between the rear edges of all saws in a battery of saws while simultaneously inhibiting backcutting by any of the saws.

Although a preferred embodiment of this invention has been illustrated and described, various modifications and changes may be resorted to without departing from the spirit of the invention or the scope of the attached claims.

I claim:

1. In combination with a saw machine having a relatively thin circular saw mounted upon an arbor with floating axial looseness and a saw guide defining a limiting control plane for guiding the leading edge of said saw, a splitter, means supporting said splitter adjacent the rear edge of said saw for lateral movement in a direction substantially parallel to said arbor, and means engageable with the rear edge of said saw for moving said splitter and maintaining said splitter in trailing relationship to the rear edge of said saw.

2. The saw machine of claim 1, said splitter having a pair of spaced guide plates disposed on opposite sides of said saw blade, the spacing between said plates being approximately equal to but slightly greater than the thickness of said saw blade, each guide plate providing an area of contact extending from the rear edge of said blade radially inward thereof.

3. The saw machine of claim 1, said splitter having a plurality of resilient contacts that extend into a region above the rear edge of said saw and occupy an area of splitting at least as wide as the kerf of said saw.

4. The saw machine of claim 3, certain of said plurality of resilient contacts projecting from one side of said splitter and certain other of said resilient contacts projecting from the opposite side of said splitter, the maximum lateral spacing between contacts on opposite sides being greater than the saw kerf of the saw, contacts on opposite sides of said splitter being moved relatively toward one another and resiliently stressed as cut pieces are moved through the machine.

5. The saw machine of claim 1, said saw having a large stiffening collar extending outward from the hub.

6. The saw machine of claim 1, said splitter comprising two plates, and means for disconnectably joining said plates to capture the rear edge of said saw.

7. The saw machine of claim 6, and further comprising a roll for transporting cut pieces through and beyond the saw, said roll being located in near proximity to the rear edge of said saw, and means for pivotally mounting each plate of said splitter from a support member vertically displaced relative to said roll, the bearing surfaces of said splitter being in front of said roll.

8. The saw machine of claim 7, and further comprising stop means for engaging the plates of each splitter and positioning the plates in pivotal and guided relation to the rear edge of said saw, the pivotal fit between each plate of said splitter and said support member allowing the plates to be rocked upon the support member to move the splitter plates laterally and displace the plates from engagement with said stop means.

9. The saw machine of claim 8, each splitter plate being formed with an elongated slot having an open side oriented to allow said plate to be disengaged from said support member when it occupies a position pivotally displaced from a region of possible contact with said saw.

10. A splitter for use in saw machines having a circular saw, said splitter comprising: a pair of spaced contacts, each contact having a bearing surface for making contact with opposite sides of a circular saw, a divider member having a plurality of resilient contacts that extend into a region above said spaced contacts and in trailing relation to the rear edge of a saw, each of said spaced contacts being formed on one of a pair of plates, respectively, and means for disconnectable joining said plates to capture the rear edge of the saw, each plate being formed with an elongated slot having an open side that allows said plate to be pivotally engaged with a support member.